Nov. 3, 1931.                L. S. FRAPPIER ET AL                1,830,538
                            SUPPORT FOR LIGHT SOURCES
                        Original Filed March 30, 1929    2 Sheets-Sheet 1

INVENTORS
Louis S. Frappier
and Ewald Boecking
BY
Austin & Dix
ATTORNEYS

Nov. 3, 1931.    L. S. FRAPPIER ET AL    1,830,538
SUPPORT FOR LIGHT SOURCES
Original Filed March 30, 1929    2 Sheets-Sheet 2
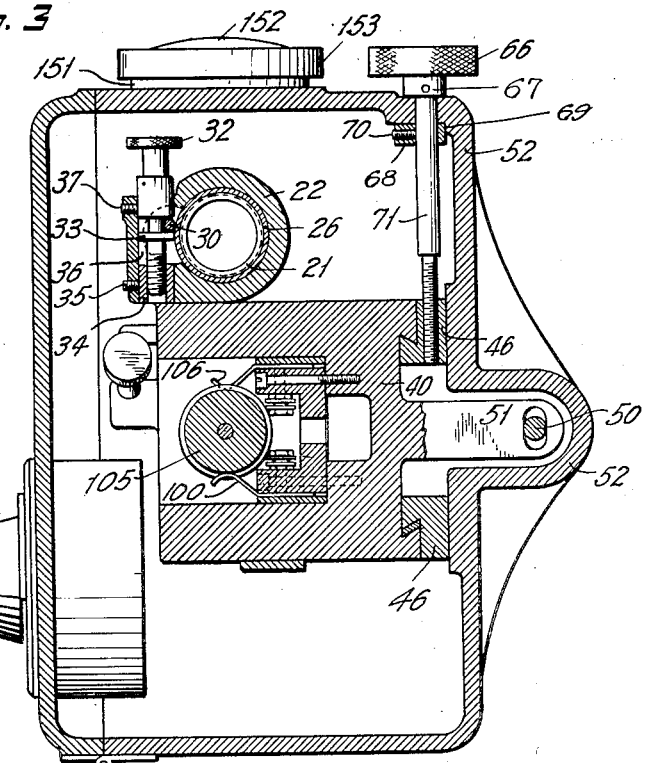
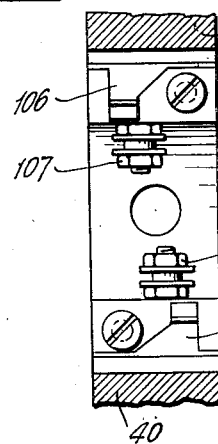
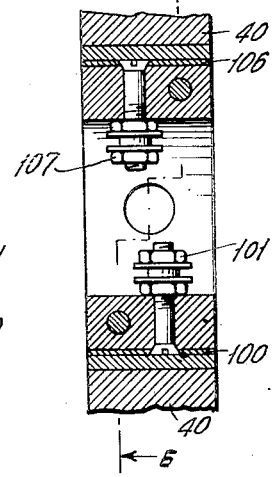
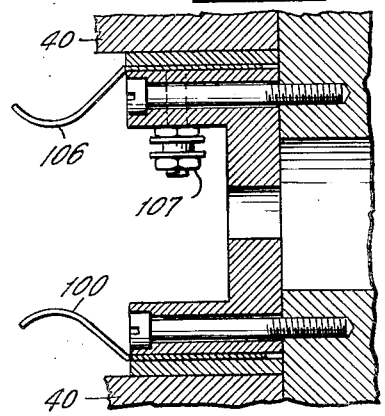
INVENTOR
Louis S. Frappier
and Ewald Boecking
BY
Austin & Dix
ATTORNEYS Patented Nov. 3, 1931

1,830,538

UNITED STATES PATENT OFFICE

LOUIS SIMON FRAPPIER AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

SUPPORT FOR LIGHT SOURCES

Original application filed March 30, 1929, Serial No. 351,393. Divided and this application filed July 24, 1930. Serial No. 470,353.

This invention relates to motion picture projection machines, and more particularly to a mechanism for reproducing sound from a photographic sound record. The invention provides a replaceable light source and a telescope, hereinafter referred to as a sound telescope, for passing light from said source through a photographic sound record carried on a moving film and focusing the light rays on a photoelectric cell contained in a separate light-proof compartment.

This application is a division of our copending application Serial No. 351,393 dated March 30, 1929 for sound reproducing mechanism for motion picture projection machines and relates particularly to the support for the light sources.

It is an object of the invention to provide means for adjusting the relative positions of the light source, and sound telescope.

Another object is to provide a simplified support for the above devices whereby they may be readily removed from the machine as separate units.

A further object is to provide adjustable means for properly positioning a plurality of replaceable light sources and for selectively bringing said sources into operative position.

A feature of the invention is an adjustable bracket on which the sound telescope and the light sources are mounted.

A further feature is an improved mounting for the light sources which permits said sources to be independently adjusted with respect to their support.

Other objects and features will be apparent as the nature of the invention is disclosed.

Although the novel features which are believed to be characteristic of this invention will be particularly pointed out in the claims appended hereto, the invention iself, as to its objects and advantages, the mode of its operation and the manner of its organization may be better understood by referring to the following description taken in connection with the accompanying drawings forming a part thereof, in which Fig. 1 is a longitudinal sectional view showing the mounting for the light sources;

Fig. 3 is a transverse sectional view of the support;

Figs. 4 and 5 are enlarged detail views of the mounting for the contact springs; and Fig. 6 is a section taken on the line 6—6 of Fig. 5.

Like reference characters denote like parts in the several figures of the drawings.

Figure 1:
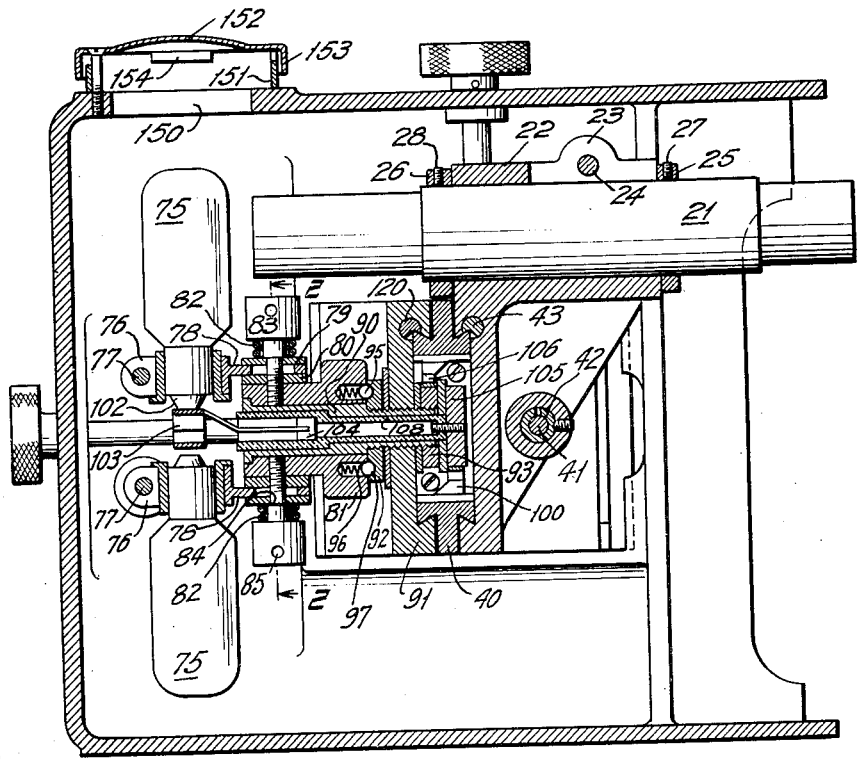
Figure 2:
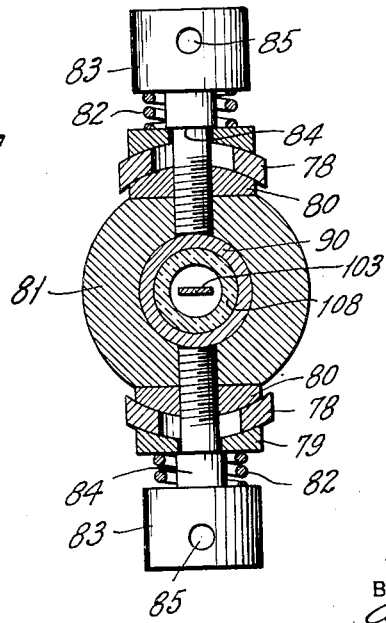
Fig. 2 is a section taken on the line 2—2 of Fig. 1 showing the adjusting means for the light sources.

In the following description and in the claims parts will be identified by specific names for convenience, but they are intended to be as generic in their application to similar parts as the art will permit.

Referring to the drawings more in detail, sound telescope 21 is shown as rotatably mounted in a split housing 22. Housing 22 is provided with a pair of ears 23 in which screw 24 is inserted for purposes of clamping the telescope in its desired position. Telescope 21 is held against axial movement by rings 25 and 26 which are placed over the telescope tube and secured thereto as by screws 27 and 28 respectively. Rings 25 and 26 may be so positioned as to cause the telescope tube to assume the desired axial relationship with respect to housing 22.

Ring 26 is provided with a longitudinally extending pin 30 (Fig. 3) by means of which the telescope is rotatably adjusted. For this purpose a thumb screw 32 is provided, having a collar 33 against which pin 30 is seated. Screw 32 is threaded in a bushing 34 which is held in a suitable bore in housing 22 by means of set screw 35. As thumb screw 32 is rotated the longitudinal movement thereof will cause pin 30 to move within the limits of recess 36 in housing 22. Clamping screw 37 is provided for locking screw 32 in the desired position.

Housing 22 is dove-tailed for movement in a direction transverse to the telescope compartment on bracket 40. The transverse position of housing 22 on said bracket is controlled by a screw 41 which is threaded in split bushings 42, carried in said housing. Housing 22 is locked in its desired position with respect to bracket 40 by grooved rod 43 which is carried in a suitable bore in said housing adjacent bracket 40, and may be held into clamping position by any suitable means.

Bracket 40 is dove-tailed for movement longitudinally of the telescope compartment on slide 46 (Fig. 3). The position thereof may be adjusted by rod 50 which is threaded in ear 51 forming an extension of said bracket 40.

Vertical adjustment of slide 46 is obtained by thumb screw 66 supported in casing 52 between collars 67 and 68 and threaded into said slide. Collar 68 is provided with a flattened surface 69 which bears against a shoulder on casing 52 and prevents turning movement of said collar. When set screw 70 is brought into engagement with shaft 71 of thumb screw 66, turning movement thereof will accordingly be prevented and the device will be locked against vertical movement.

A pair of light sources 75 are adjustably secured in split sockets 76 (Fig. 1) in which they may be clamped by set screws 77. Sockets 76 are provided with curved shanks 78 which are secured between washers 79 and 80. Washers 80 are provided with a curved surface adjacent shank 78 and a flat surface which is positioned on a flattened portion of sleeve 81. Washers 79 are provided with a curved surface which is positioned adjacent shank 78 and a flat surface which receives spring 82. Set screw 83 is threaded into sleeve 81 and is provided with a shoulder 84 by means of which washers 79 and 80 and shank 78 of socket 76 are firmly clamped to said sleeve. Spring 82 is seated between the head of screw 83 and the flat surface of washer 79. Shank 78 is provided with a large hole through which set screw 83 passes, the hole providing clearance to permit adjustment of socket 76 with respect to sleeve 81. Set screws 83 are provided with holes 85 into which a tool may be inserted for purposes of adjustment.

Cylindrical sleeve 81 is rotatably mounted on bushing 90 which is secured to slide 91 by nuts 92 and 93 which are threaded on said bushing. Balls 95 are carried in suitable recesses in sleeve 81 and are pressed outwardly by springs 96 into engagement with depressions 97 in nut 92 for properly positioning sleeve 81 and light source 75 with respect to the sound telescope 21.

Electric current is supplied to socket 76 through shank 78, bushing 81, sleeve 90, nut 93, brush 106 and terminal 107 (Figs. 4 to 6). Current is fed to contact 102 of light source 75 through spring 103, bolt 104, nut 105, brush 100 and terminal 101. Insulating bushing 108 separates bolt 104 from bushing 90. Brushes 100 and 106 permit the light source to be removed in a manner to be pointed out without disturbing the electrical connections in the telescope compartment.

Slide 91 is dove-tailed for transverse sliding movement on bracket 40 and is locked to housing 22 by means of a suitable latch member. Slide 91 may be locked with respect to bracket 40 by grooved rod 120 which is carried in a suitable bore in said slide and may be rotated into engagement with bracket 40.

The sound telescope compartment is ventilated through an aperture 150 in casing 52. A circular baffle plate 151 surrounds aperture 150 and a cap 152 having a downwardly extending flange 153 is positioned over said baffle plate. Baffle plate 151 is provided with a plurality of grooves 154 through which air may escape from the interior of the telescope compartment passing through aperture 150, apertures 154, of the baffle plate and downwardly beneath flange 153 to the atmosphere. The ventilating mechanism is preferably located directly over light source 75 in order to allow the heat developed by said light source to be dissipated.

In the mechanism above described it is to be noted that telescope 21 can be rotatably adjusted by means of thumb screw 32 and may be adjusted longitudinally with respect to housing 22 by means of collars 25 and 26. The light source 75 may be independently adjusted by reason of the curved shank 78 and the cooperating washers which provide a connection equivalent to a ball and socket joint. The entire assembly may be adjusted transversely of bracket 40 and may be adjusted both longitudinally and vertically by adjusting screws 50 and 66 respectively. Furthermore, either the telescope or the light source may be independently removed from bracket 40 by merely releasing the grooved rods 43 and 120.

Although a pair of light sources have been shown arranged at an 180° angle with respect to each other, it is obvious that any desired number may be employed and may be suitably spaced about the periphery of sleeve 81. The various means of adjustment of the telescope, light source and photoelectric cell insure the proper positioning of these elements with respect to the light rays and to the photographic film.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A support for a plurality of light sources comprising a rotatable sleeve, a plurality of sockets spaced peripherally of said sleeve, each said socket having a curved shank, and means for securing said shank to said sleeve comprising a set screw extending through said shank into said sleeve, the curved shank of said socket having an aperture substantially larger than said screw whereby variable adjustment thereof may be obtained.

2. A support for a plurality of light sources comprising a rotatable sleeve, a plurality of sockets spaced peripherally of said sleeve, each said socket having a curved shank, washers having surfaces complementarily curved engaging said shank, and a set screw extending through said washers and said shank into said sleeve, the curved shank of said socket having an aperture substantially larger than said screw whereby variable adjustment thereof may be obtained.

3. A support for a plurality of light sources comprising a rotatable sleeve, a plurality of sockets spaced peripherally of said sleeve, each said socket having a curved shank, washers having surfaces complementarily curved engaging said shank, one of said washers having a flat surface engaging a flattened portion of said sleeve, and a set screw extending through said washers and said shank into said sleeve, the curved shank of said socket having an aperture substantially larger than said screw whereby variable adjustment thereof may be obtained.

4. A support for a plurality of light sources comprising a rotatable sleeve, a plurality of sockets spaced peripherally of said sleeve, each said socket having a curved shank, washers having surfaces complementarily curved engaging said shank, one of said washers having a flat surface engaging a flattened portion of said sleeve, a set screw extending through said washers and said shank into said sleeve and having a shoulder for clamping said elements, the curved shank of said socket having an aperture substantially larger than said screw whereby variable adjustment thereof may be obtained.

5. A support for a plurality of light sources comprising a rotatable sleeve, a plurality of sockets spaced peripherally of said sleeve, each said socket having a curved shank, washers having surfaces complementarily curved engaging said shank, one of said washers having a flat surface engaging a flattened portion of said sleeve, a set screw extending through said washers and said shank into said sleeve, and a spring carried on said set screw between the head of said screw and the surface of the other of said washers for causing frictional engagement thereof when said elements are unclamped, the curved shank of said socket having an aperture substantially larger than said screw whereby variable adjustment thereof may be obtained.

6. A support for a plurality of light sources comprising a rotatable sleeve, a plurality of sockets spaced peripherally of said sleeve, each said socket having a curved shank, washers having surfaces complementarily curved engaging said shank, one of said washers having a flat surface engaging a flattened portion of said sleeve, a set screw extending through said washers and said shank into said sleeve and having a shoulder for clamping said elements, and a spring carried on said set screw between the head of said screw and the surface of the other of said washers for causing frictional engagement thereof when said elements are unclamped, the curved shank of said socket having an aperture substantially larger than said screw whereby variable adjustment thereof may be obtained.

7. A support for a plurality of light sources comprising a rotatable sleeve, a plurality of sockets spaced peripherally of said sleeve, each said socket having a curved shank, and means for securing said shank to said sleeve and permitting relative lateral and peripheral adjustment thereof.

In testimony whereof we have hereunto set our hands.

LOUIS S. FRAPPIER.
EWALD BOECKING.